No. 786,516.

PATENTED APR. 4, 1905.

J. C. PHELAN.
PIPE COUPLING.
APPLICATION FILED NOV. 30, 1904.

Witnesses:
H. B. Davis
Maud M. Pipu

Inventor:
Joseph C. Phelan
by Noyes & Hanniyau
Atty

No. 786,516.

Patented April 4, 1905.

UNITED STATES PATENT OFFICE.

JOSEPH C. PHELAN, OF LYNN, MASSACHUSETTS.

PIPE-COUPLING.

SPECIFICATION forming part of Letters Patent No. 786,516, dated April 4, 1905.

Application filed November 30, 1904. Serial No. 234,833.

*To all whom it may concern:*

Be it known that I, JOSEPH C. PHELAN, of Lynn, county of Essex, State of Massachusetts, have invented an Improvement in Pipe-Couplings, of which the following description, in connection with the accompanying drawings, is a specification, like characters on the drawings representing like parts.

It is a general practice to connect adjacent ends of steam, water, or gas pipes already in place in buildings by means of the ordinary right and left threaded coupling or by couplings having ground or packed joints. With the ordinary right-and-left coupling it often happens through lack of skill or on account of carelessness on the part of the pipe-fitter that the thread at one end of the coupling fits much more closely to the thread on the pipe which it engages than it does at the other end, so that when the coupling is turned to tighten both joints simultaneously the member will be only turned far enough to make a tight connection with one of the pipes and not far enough to make a tight connection with the other pipe, the close engagement with the one preventing the coupling-ring from being turned far enough to tighten the other. A leak in a joint of this character is difficult to stop and is usually not discovered until after the work is completed, for it is difficult or impossible for the workman to tell whether the coupling engages each pipe with equal closeness or not.

While union-couplings employing ground joints are more or less satisfactory for the purpose, yet they are expensive to manufacture, as they must be machined, and, moreover, they cannot be made satisfactorily from ordinary cast-iron. A packed joint cannot be used for steam or hot water and is, moreover, objectionable for this purpose for various well-known reasons.

The object of my invention is to provide a coupling of simple form which is adapted to connect two pipes without necessitating the employment of packing or the provision of ground seats to make a tight joint and which enables the connection with the pipes at the end of the coupling to be tightened independently, so that each connection directly with the pipes may be made perfectly tight, notwithstanding the fact that the pipe-fitter may cut the threads thereon differently, thereby obviating the objections above noted as to the ordinary right-and-left coupling above referred to.

A further object is to provide a coupling which is less expensive to manufacture than the said ground-joint couplings and which, furthermore, may be made from ordinary cast-iron.

Figure 1:
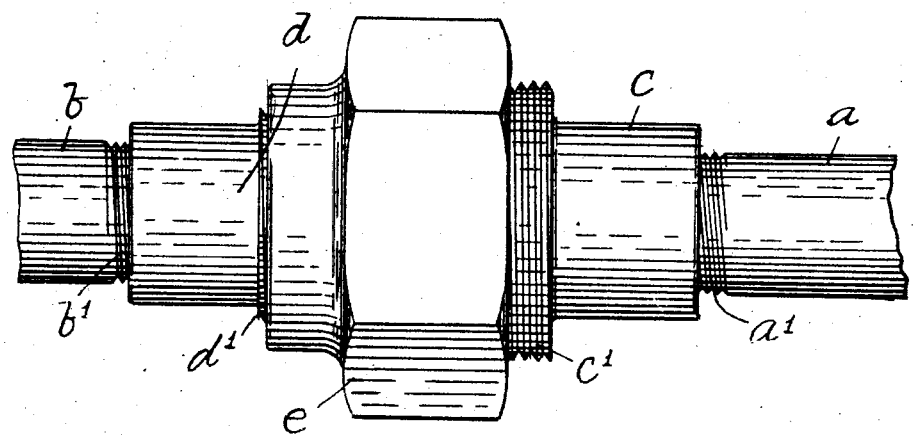
Figure 2:
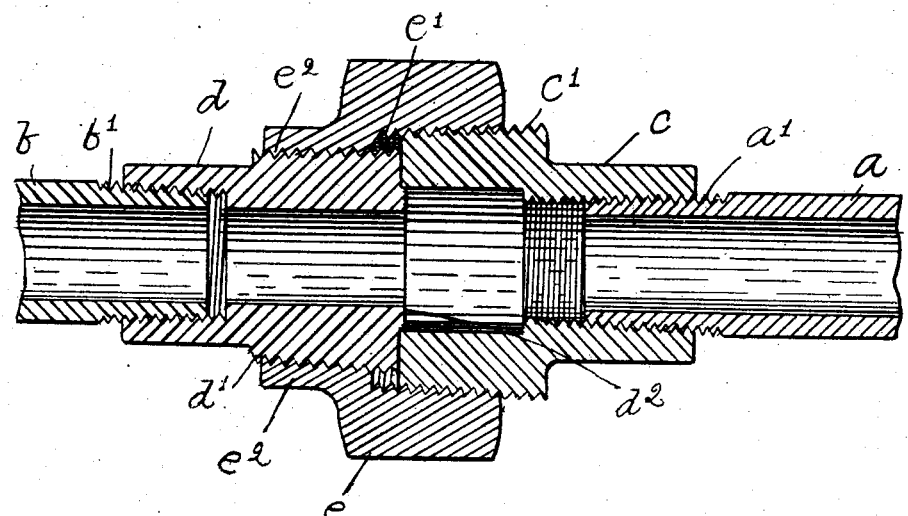
Figure 3:
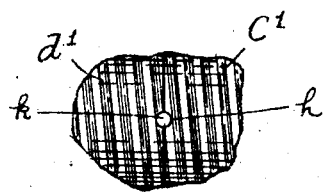

Figure 1 is a side elevation of a pipe-coupling made according to my invention, and Fig. 2 is a longitudinal central section thereof. Fig. 3 is a detail of a portion of the coupling members.

The ends of the two pipes to be connected, $a$ and $b$, are respectively provided with external tapering threads $a'$ $b'$. Two coupling members $c$ and $d$ are provided with correspondingly-tapered internal screw-threads, so that when they are screwed tightly upon the respective pipes $a$ and $b$ a perfectly tight connection is provided therebetween.

The members $c$ and $d$ are provided with exteriorly-threaded tapered portions $c'$ and $d'$, respectively, the portion $c'$ tapering from the middle portion of member $c$ to the end thereof opposite the end connected to the pipe $a$ and the portion $d'$ tapering from the end of the member $d$ opposite the pipe $b$ toward the middle thereof. The threads on said portions $c'$ and $d'$ are of the same pitch and decrease in depth from the ends of smaller diameter, and the minimum diameter of the threaded portion $c'$ of member $c$ is greater than the maximum diameter of member $d$.

A coupling-ring $e$ is provided the outer side of which is preferably hexagonal, so that a wrench may be readily applied thereto. Said ring is provided with internal screw-threads $e'$ $e^2$, which are tapered in the same direction and have the same pitch as the threads $c'$ and $d'$, the thread $e'$ being adapted to be threaded upon the thread $c'$ and the thread $e^2$ being adapted to be threaded upon the thread $d'$ and both threads $e'$ and $e^2$ decreasing in depth correspondingly. The tapering threads on the members $c$ and $d$ are preferably formed while both members are securely held on an arbor with their ends pressed closely together. While in this position a hole $h$ may be bored radially into the abutting ends of said members, and a key $k$ may be inserted therein to hold them in alinement. (See Fig. 3.) When the members are in this position, ring $e$ may be threaded simultaneously thereon, and when the threads are constructed properly the two threaded portions of the ring will tighten simultaneously on the members $c$ $d$ as it is screwed thereon. The large end of the member $d$ is preferably provided with a centering-boss $d^2$, which fits closely into the bore of member $c$.

The manner of connecting the pipes $a$ and $b$ is as follows: The ring $e$ is first placed on the left-hand pipe $b$, and then the internally-threaded ends of the members $c$ and $d$ are screwed upon the ends of said pipes $a$ and $b$ until a perfectly tight joint is formed therebetween. The opposite ends of the members $c$ and $d$ are then brought into close contact and centered by boss $d^2$. They are also turned so that the recesses formed by hole $h$ exactly register, and the key $k$ is preferably inserted therein. The ring $e$ is then moved forward and rotated so that its thread $e'$ engages the thread $c'$ of member $c$ and its thread $e^2$ engages the thread $d'$ of the member $c$ and its thread $e^2$ engages the thread $d'$ of the member $d$ simultaneously. The ring is then screwed upon said members until the threads of decreasing depth of said members and said ring respectively engage and form a perfectly tight connection between each end of the ring $e$ and the adjacent ends of the members $c$ and $d$.

The threads on the ends of pipes $a$ and $b$ are preferably either both right-hand or both left-hand threads and both of the same pitch, so that if the members should be turned on the pipes in tightening the ring $e$ their relative longitudinal disposition will not be disturbed. The key $k$ prevents the members $c$ and $d$ from being turned independently by reason of a closer fit between the threads of one section of the ring with those on one member than between the threads of the other section and the threads on the other member, so that the relative position of said members, in which the ring may be screwed thereon simultaneously, will not be disturbed. However, as these threads will be formed with accurately-made taps and dies by skilled workmen the force of engagement between the two threaded portions of the ring and the respective threads of the members will be practically the same, and the joints formed therebetween will be equally tight.

The above-described coupling may be readily applied and a tight connection formed by a comparatively unskilled workman, as special care and skill in cutting the threads on the pipes is not requisite. A joint is thus produced which is more reliable and less likely to leak than the joints of a right-and-left coupling or a ground or packed joint.

With this form of coupling, moreover, two pipes may be connected without drawing them together during the act of tightening the joint, and in some instances this is an advantage of special importance.

Having thus described my invention, what I claim as new, and desire to secure by Letters Patent, is—

1. A pipe-coupling comprising two tubular coupling members adapted to be disposed end to end, and each having an externally-threaded portion provided with screw-threads of the same pitch, and which decrease in depth as they approach the larger ends thereof, the end of greater diameter of one portion being of less diameter than, and next to the end of smaller diameter of the other portion, means for holding said members from relative rotation in a predetermined relative position, and a coupling-ring having two internally-threaded, tapered portions respectively adapted and disposed to engage and coact with the threads of said members while in said position, and to be moved simultaneously into tight engagement with the threads of decreasing depth thereof, substantially as described.

2. A pipe-coupling comprising two tubular coupling members adapted to be disposed end to end, and each having an externally-threaded portion provided with screw-threads of the same pitch, and which decrease in depth as they approach the larger ends thereof, the end of greater diameter of one portion being of less diameter than, and next to the end of smaller diameter of the other portion, means for holding said members from relative rotation in a predetermined relative position, and a coupling-ring having two tapered portions provided with threads of decreasing depth respectively adapted and disposed to engage and coact with the threads of said members while in said position, and to have the threads of decreasing depth thereof simultaneously tightly engage the threads of decreasing depth of said members, substantially as described.

In testimony whereof I have signed my name to this specification in the presence of two subscribing witnesses.

JOSEPH C. PHELAN.

Witnesses:
  LOUIS H. HARRIMAN,
  H. B. DAVIS.